United States Patent
Kamble et al.

(10) Patent No.: US 9,444,734 B2
(45) Date of Patent: Sep. 13, 2016

(54) PACKET SWITCHING WITHOUT LOOK-UP TABLE FOR ETHERNET SWITCHES

(71) Applicant: International Business Machines Corporation, Armonk, NY (US)

(72) Inventors: Keshav G. Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 13/779,553

(22) Filed: Feb. 27, 2013

(65) Prior Publication Data

US 2013/0272303 A1    Oct. 17, 2013

Related U.S. Application Data

(63) Continuation of application No. 13/448,265, filed on Apr. 16, 2012, now Pat. No. 8,902,896.

(51) Int. Cl.
*H04W 72/00* (2009.01)
*H04L 12/741* (2013.01)

(52) U.S. Cl.
CPC .............. *H04L 45/74* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 6,661,787 B1 | 12/2003 | O'Connell et al. |
| 6,690,667 B1 | 2/2004 | Warren |
| 6,944,170 B2 | 9/2005 | Minkenberg |
| 7,058,751 B2 | 6/2006 | Kawarai et al. |
| 7,466,703 B1 | 12/2008 | Arunachalam et al. |
| 7,522,589 B2 | 4/2009 | O'Neill et al. |
| 7,529,851 B1 | 5/2009 | Haley et al. |
| 7,620,048 B2 | 11/2009 | Bass et al. |
| 7,720,055 B2 | 5/2010 | Kadambi et al. |
| 7,724,747 B2 | 5/2010 | Jain et al. |
| 7,746,854 B2 | 6/2010 | Ambe et al. |
| 7,778,259 B1 | 8/2010 | Mahalingaiah |
| 7,848,327 B2 | 12/2010 | Jain et al. |
| 7,877,519 B2 | 1/2011 | Eldar |
| 7,995,465 B2 | 8/2011 | Abdulla et al. |
| 8,219,690 B2 | 7/2012 | Shigeta et al. |
| 8,446,910 B2 | 5/2013 | Chen et al. |
| 8,861,401 B2 | 10/2014 | Anantharam et al. |
| 8,902,896 B2 | 12/2014 | Kamble et al. |
| 2002/0052972 A1 | 5/2002 | Yim |

(Continued)

FOREIGN PATENT DOCUMENTS

| | | |
|---|---|---|
| CN | 104221331 A | 12/2014 |
| DE | 112013001904 T5 | 12/2014 |

(Continued)

OTHER PUBLICATIONS

Notice of Allowance and Fee(s) Due from U.S. Appl. No. 13/438,794 dated Jun. 9, 2014.

(Continued)

*Primary Examiner* — Sulaiman Nooristany
(74) *Attorney, Agent, or Firm* — Zilka-Kotab, PC

(57) ABSTRACT

In one embodiment, a method for packet switching includes receiving a packet, wherein the packet comprises a header and a payload; determining, without using a look-up table, a destination port based on a destination address stored in the header; and sending the packet to the destination port.

11 Claims, 7 Drawing Sheets

(56) References Cited

U.S. PATENT DOCUMENTS

| | | | |
|---|---|---|---|
| 2003/0133451 | A1 | 7/2003 | Mahalingaiah |
| 2004/0111494 | A1 | 6/2004 | Kostic et al. |
| 2004/0170181 | A1* | 9/2004 | Bogdon .............. H04L 12/5692 370/400 |
| 2005/0190697 | A1 | 9/2005 | Dohi et al. |
| 2007/0211653 | A1 | 9/2007 | Mizukoshi |
| 2007/0286073 | A1 | 12/2007 | Pullen et al. |
| 2008/0168120 | A1 | 7/2008 | Suzuyama et al. |
| 2008/0247396 | A1 | 10/2008 | Hazard |
| 2008/0247399 | A1* | 10/2008 | Hazard ................ H04L 45/02 370/395.31 |
| 2010/0118831 | A1* | 5/2010 | Chen .................. H04L 61/2015 370/331 |
| 2010/0135219 | A1 | 6/2010 | Donaghey |
| 2010/0265824 | A1 | 10/2010 | Chao et al. |
| 2010/0322076 | A1* | 12/2010 | Goel ...................... G06F 9/505 370/236 |
| 2011/0096781 | A1 | 4/2011 | Aybay |
| 2011/0292939 | A1 | 12/2011 | Subramaian et al. |
| 2012/0082062 | A1 | 4/2012 | Mccormack |
| 2012/0263048 | A1 | 10/2012 | Chen et al. |
| 2012/0320748 | A1 | 12/2012 | Schmidtke et al. |
| 2013/0258899 | A1 | 10/2013 | Anantharam et al. |
| 2013/0259048 | A1 | 10/2013 | Anantharam et al. |
| 2013/0272304 | A1 | 10/2013 | Kamble et al. |
| 2014/0334498 | A1 | 11/2014 | Anantharam et al. |
| 2014/0362862 | A1 | 12/2014 | Kamble et al. |

FOREIGN PATENT DOCUMENTS

| | | |
|---|---|---|
| GB | 2515442 A | 12/2014 |
| JP | 2006190141 | 7/2006 |
| KR | 20140107173 A | 9/2014 |
| WO | 2013150404 A1 | 10/2013 |

OTHER PUBLICATIONS

Non-Final Office Action from U.S. Appl. No. 13/797,874, dated Apr. 20, 2015.
Non-Final Office Action from U.S. Appl. No. 14/447,455, dated Dec. 18, 2014.
Non-Final Office Action from U.S. Appl. No. 13/438,794 dated Dec. 2, 2013.
Non-Final Office Action from U.S. Appl. No. 13/797,874 dated Dec. 2, 2013.
International Search Report and Written Opinion from PCT application No. PCT/IB2013/052168 dated Jun. 18, 2013.
Non-Final Office Action from U.S. Appl. No. 13/797,874, dated Aug. 26, 2014.
Notice of Allowance from U.S. Appl. No. 13/448,265, dated Jul. 24, 2014.
U.S. Appl. No. 14/447,455, filed Jul. 30, 2014.
U.S. Appl. No. 14/469,360, filed Aug. 26, 2014.
Restriction/Election requirement from U.S. Appl. No. 13/448,265 dated May 16, 2014.
U.S. Appl. No. 13/448,265, filed Apr. 16, 2012.
Yao, Andrew, "Should Tables Be Soiled?", IPCOM000150654D, Apr. 18, 2007, Database entry Copyright (c) Software Patent Institute, ip.com Prior Art Database, pp. 1-37.
"Method and Apparatus for look-up-table coded symbol system to substitute white noise packet payload," IBM, IPCOM000029823D, Jul. 14, 2004, ip.com Prior Art Database, pp. 1-5.
Zseby, T. et al., "Sampling and Filtering Techniques for IP Packet Selection (RFS5475)," IPCOM000181400D, Mar. 1, 2009, Copyright (c) 2009 IETF Trust and the persons identified as the . . . , ip.com Prior Art Database, pp. 1-48.
U.S. Appl. No. 13/797,874, filed Mar. 12, 2013.
U.S. Appl. No. 13/438,794, filed Apr. 3, 2012.
Non-Final Office Action from U.S. Appl. No. 13/438,794 dated Jul. 12, 2013.
Final Office Action from U.S. Appl. No. 13/797,874, dated Oct. 29, 2015.
Final Office Action from U.S. Appl. No. 14/447,455, dated Jul. 24, 2015.
Notice of Allowance from U.S. Appl. No. 13/797,874, dated Feb. 8, 2016.
Non-Final Office Action from U.S Appl. No. 14/469,360, filed Feb. 16, 2016.
Non-Final Office Action from U.S Appl. No. 14/447,455, dated Apr. 22, 2016.
Notice of Allowance from U.S. Appl. No. 13/797,874, dated May 31, 2016.

* cited by examiner

PACKET SWITCHING WITHOUT LOOK-UP TABLE FOR ETHERNET SWITCHES

RELATED APPLICATIONS

This application is a continuation of copending U.S. patent application Ser. No. 13/448,265, filed Apr. 16, 2012; which is herein incorporated by reference.

BACKGROUND

The present invention relates to data center infrastructure, and more particularly, this invention relates to Ethernet switches capable of packet switching without the use of a look-up table.

In packet-switched network switches, look-up is typically performed on a destination media access control (MAC) address or a destination internet protocol (IP) address to discover an actual destination port for forwarding the packet. Most systems utilize a switching processor of some kind, such as an application specific integrated circuit (ASIC). The switching processor maintains look-up tables for performing the look-up resolution, which in typically networks may be rather long having thousands of entries. The look-up tables are either stored on chip or stored external to the chip. In either case, the use of a look-up table adds significant logical complexity, space, and memory requirements on the chip. This additional complexity eventually makes the chip more expensive than is desired. Accordingly, it would be beneficial to be able to discover an actual destination port without the use of a look-up table.

SUMMARY

In one embodiment, a method for packet switching includes receiving a packet, wherein the packet has a header and a payload, determining, without using a look-up table, a destination port based on a destination address stored in the header, and sending the packet to the destination port.

In another embodiment, a method for assigning IP addresses includes creating an address allocation table having a plurality of values, each value being associated with one port and a plurality of IP addresses which, when an algorithm is applied individually thereto, result in the value associated with the port, receiving a dynamic host configuration protocol (DHCP) multicast packet requesting an IP address for a device, determining a port to which the device is electrically connected to a switch based on the port on which the request is received at the switch, choosing an IP address from the address allocation table such that applying the algorithm to the IP address results in a value that is associated with the port to which the device is electrically connected to the switch, and assigning the IP address to the device.

Other aspects and embodiments of the present invention will become apparent from the following detailed description, which, when taken in conjunction with the drawings, illustrate by way of example the principles of the invention.

DETAILED DESCRIPTION

Figure 1:
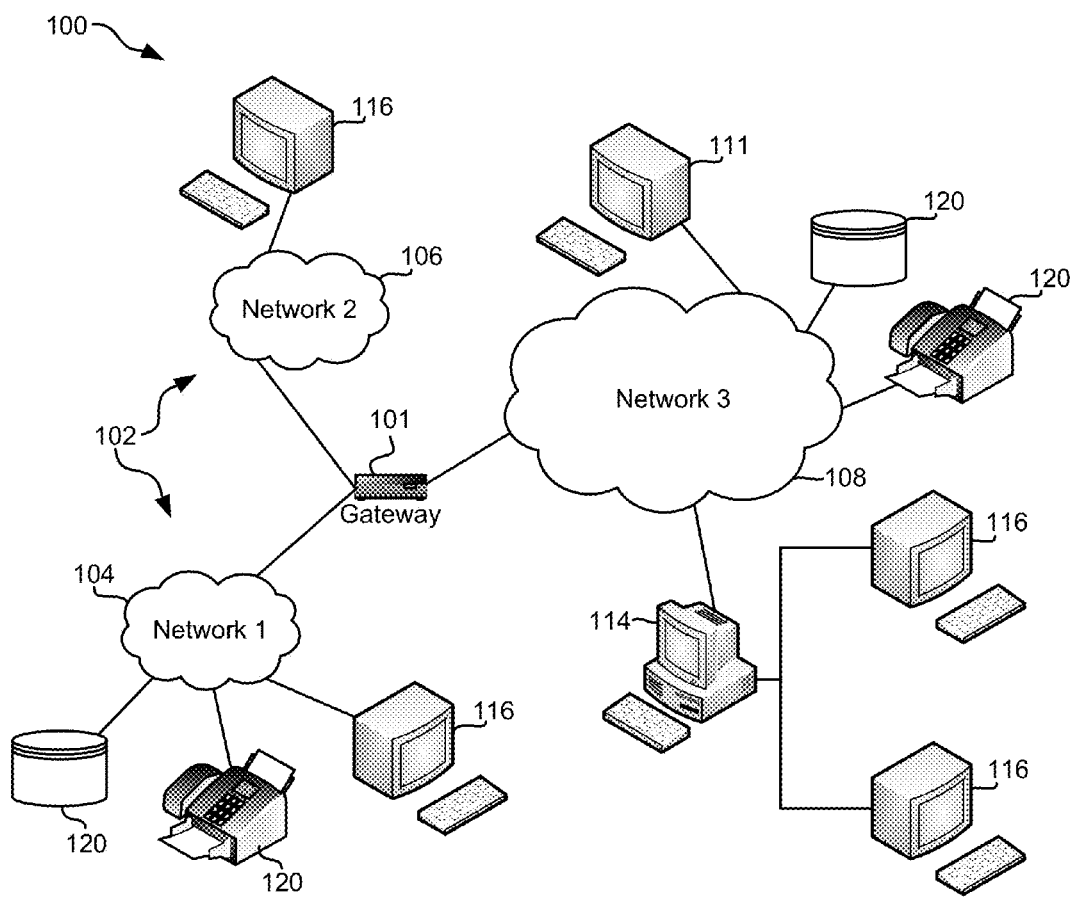
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a destination port to send a received packet is determined without using a look-up table. The approach implemented herein speeds the determination of the destination port by a switching device based on an algorithm instead of a look-up table.

In one general embodiment, a system includes a switching processor that includes logic configured for receiving a packet, wherein the packet has a header and a payload, logic configured for determining, without using a look-up table, a destination port based on a destination address stored in the header, and logic configured for sending the packet to the destination port.

In another general embodiment, a system includes a processor adapted for executing logic, logic configured for creating an address allocation table having a plurality of values, each value being associated with a plurality of internet protocol (IP) addresses which, when an algorithm is applied thereto, result in the associated value, logic configured for receiving a request for an IP address from a device electrically connected to a switch, and logic configured for determining a port to which the device is electrically connected to the switch based on the port on which the request is received.

According to another general embodiment, a method for packet switching includes receiving a packet, wherein the packet has a header and a payload, determining, without using a look-up table, a destination port based on a destination address stored in the header, and sending the packet to the destination port.

In yet another general embodiment, a method for assigning IP addresses includes creating an address allocation table having a plurality of values, each value being associated with one port and a plurality of IP addresses which, when an algorithm is applied individually thereto, result in the value associated with the port, receiving a dynamic host configuration protocol (DHCP) multicast packet requesting an IP address for a device, determining a port to which the device is electrically connected to a switch based on the port on which the request is received at the switch, choosing an IP address from the address allocation table such that applying the algorithm to the IP address results in a value that is associated with the port to which the device is electrically connected to the switch, and assigning the IP address to the device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
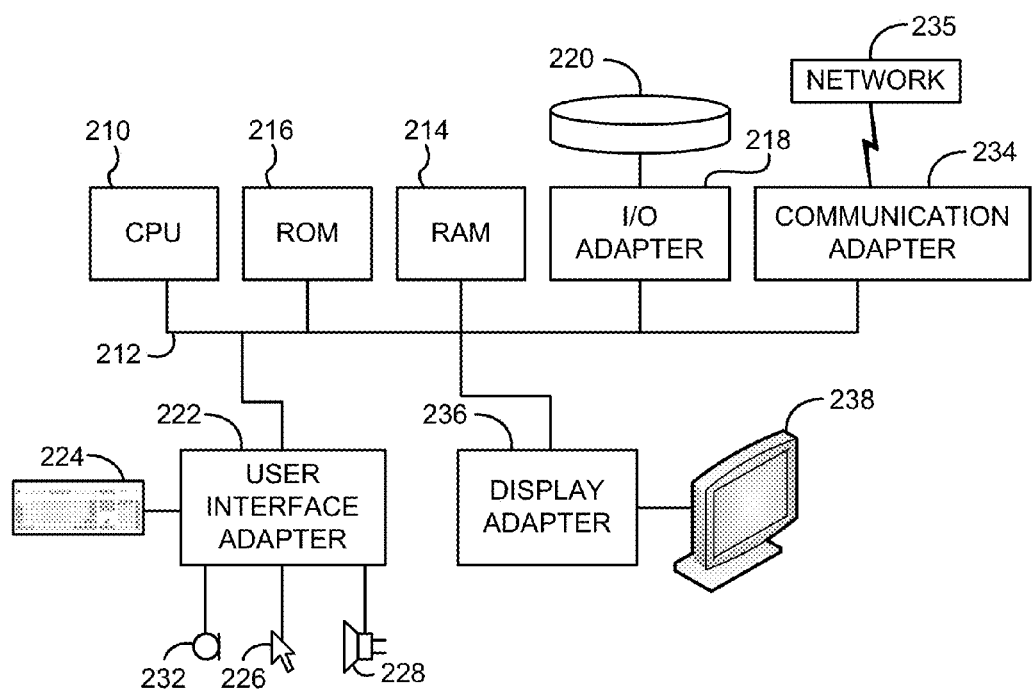
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
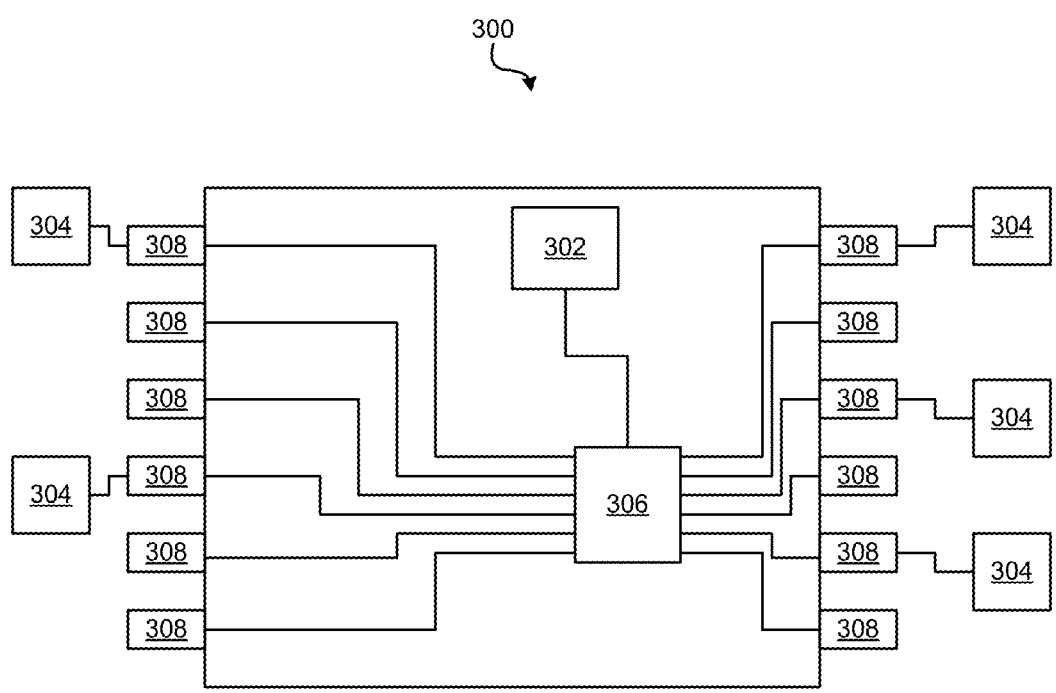
FIG. 3 is a simplified diagram of a switching device, according to one embodiment.

Referring now to FIG. 3, a switching system 300 is shown according to one embodiment. As shown, the switching system 300 comprises a server 302, such as a DHCP server, adapted for assigning and managing device addresses for devices 304 electrically connected to the switching system 300. The server 302 is electrically coupled to a switching processor 306 for executing logic. Any type of processor known in the art may be used for the server 302 and/or the switching processor 306, such as a central processing unit (CPU), a field programmable gate array (FPGA), an integrated circuit (IC), an application specific integrated circuit (ASIC), etc. The device addresses (which may also be referred to as destination addresses herein) may comprise IP addresses, in some approaches.

Figure 4:
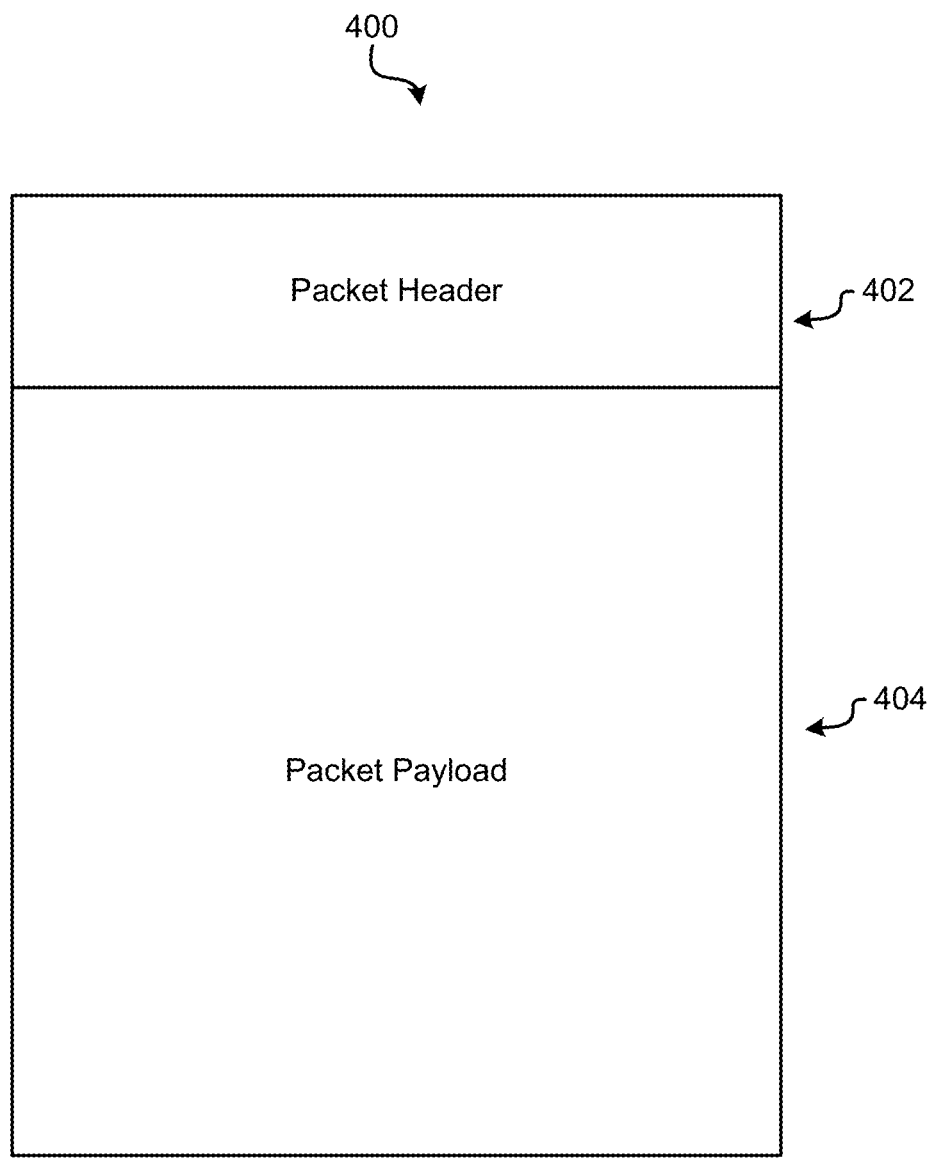
FIG. 4 is a simplified diagram of a packet, according to another embodiment.

The switching processor 306 comprises or has access to logic configured for receiving at least one packet. As shown in FIG. 4, each received packet 400 comprises a header 402 and a payload 404. Referring now to FIGS. 3-4, the switching processor 306 further comprises or has access to logic configured for determining, without using a look-up table, a destination port 308 based on a destination address stored in each packet's header 402, and logic configured for sending each packet 400 to the determined destination port 308 based on the destination address stored to the packet's header 402. This logic may be performed on a single packet 400, or on a plurality of packets 400, where each packet's header 402 is examined to determine a destination address to send the particular packet 400.

Typically, in conventional switching devices, a look-up table which lists all destination addresses associated with destination ports on the switching device is created by adding new entries each time a device is detected as being connected to one of the destination ports of the switching device. This large look-up table may take significant amounts of time to perform look-ups on each time a packet is received to send to one of the destination addresses.

According to embodiments described herein, a destination port may be a single physical port to which a device is electrically connected, a logical port representing a collection of one or more physical ports, a virtual port, a combination thereof, etc., as would be appreciated by one of skill in the art upon reading the present descriptions.

In some embodiments, more than one destination port 308 may be determined, such as a group of destination ports 308 in a link aggregation group (LAG), in one example. In these embodiments, other logic (not described herein) may be used to determine which destination port 308 from the group of destination ports 308 to send the packet 400, based on any number of factors or criteria, such as usage, processing speeds, traffic patterns, etc. In a further embodiment, the LAG may be represented by a logical port, which may be the destination port which is selected.

In one embodiment, the logic configured for determining, without using a look-up table, the destination port 308 based on the destination address stored in the header 402 may comprise logic configured for calculating a value based on the destination address using an algorithm and logic configured for selecting a destination port 308 associated with the value, wherein each destination port 308 is pre-associated with one value.

The algorithm may be any suitable algorithm known in the art, such as an algorithm comprising a hash function, a transform function, a relativity function, an artificial neural network function, etc. Of course, combinations of these functions may be used in an algorithm, in some approaches. In addition, the algorithm may be a perfect algorithm or an imperfect algorithm, and/or the algorithm may be tailored, designed, manipulated, and/or otherwise constructed in a manner consistent with the desires and goals of a system administrator to act in a certain, predefined way when presented with ports, addresses, and values, in some approaches.

In one embodiment, each port 308 may be associated with one value using an address allocation table. In this embodiment, the system 300 may further comprise logic configured for choosing the address for a device 304 from an address allocation table such that applying the algorithm to the chosen address results in a value that is associated with the port 308 connected to the device 304.

In one approach, the address allocation table may comprise a plurality of addresses selected from an address pool of all addresses. The address allocation table may be indexed by the destination ports 308 (network ports) that are on the switching device 300. If the switching device 300 has 48 ports, the address allocation table may be 48 rows in size, one row for each destination port 308. If the switching device 300 has 96 ports, the address allocation table may be 96 rows in size, and so on. Each address allocation table entry (row) comprises multiple destination addresses (such as IP addresses) selected from the address pool according to adherence to an algorithm. That is to say that each destination address in a single table entry (row) share a common property. In one embodiment, that common property may be that all of the destination addresses, when an algorithm is applied thereto, produce the same value (output).

In one such embodiment, the address allocation table may comprise a plurality of values, each value being associated with a plurality of addresses which, when the algorithm is applied thereto, results in the associated value. In turn, each of these values may be associated with a single port of the switching system 300.

According to one embodiment, a hashing algorithm may be used. For an IPv4 address, the hashing algorithm may be H(I)=(I[0]*1 XOR I[1]*2 XOR I[2]*3 XOR I[3]*4) MOD P. For an IPv6 address, the hashing algorithm may be H(I)=(I[0]*1 XOR I[1]*2 XOR I[2]*3 XOR I[3]*4 XOR I[4]*5 XOR . . . I[15]*16) MOD P, where H(I)=hash (value) of all 4 bytes for IPv4 or hash of all 16 bytes for IPv6, and P=total number of ports for the packet switch DHCP server is running on. Of course, any suitable algorithm may be used, as would be known to one of skill in the art. Any type of perfect algorithm may be used, or imperfect algorithms, with acceptable amounts of uncertainty regarding duplicate values.

After applying the algorithm, the address allocation table is created, such as by a DHCP server 302 of a switching system 300, possibly at boot up or during a start-up process. The switching device 300 then keeps the address allocation table ready for the address allocation during run time.

In another embodiment, the switching processor 306 may further comprise or have access to logic configured for choosing the destination address for a device 304 from an address allocation table such that applying the algorithm to the chosen destination address results in a value that is associated with the destination port 308 connected to the device 304.

In a further embodiment, the address allocation table may be created during a start-up process (e.g., boot-up) of a server 302 (such as the DHCP server of the switching device 300) and stored to a memory of the server 302.

Upon powering off of the server or switching system 300, according to one embodiment, a preset global setting may indicate whether associated devices which received their address from the switching system 300 seek out a new address or maintain the address they were assigned. In this way, the address allocation table may either be maintained during a power-off situation, or it may be rebuilt upon powering on, according to two embodiments. This setting may be determined by a system administrator, according to one approach.

In another embodiment, the switching processor 306 may further comprise logic configured for receiving an address resolution protocol (ARP) broadcast packet from a first device, wherein the ARP broadcast packet comprises an ARP request that comprises an IP address, logic configured for extracting the IP address from the ARP request and calculating a value based on the IP address using an algorithm, logic configured for selecting a port associated with the value, wherein each port is pre-associated with one value (which is possibly associated with a plurality of IP addresses), and logic configured for unicasting the broadcast ARP packet to the selected port to determine a media access control (MAC) address of a second device electrically connected to the selected port (and accordingly with the switching system 300) subsequently reducing wasteful traffic on the network since the packet is not broadcast to all devices. Instead, the device sending the ARP packet wants to know a MAC address of a single device, and the packet is broadcast to that device only.

In another embodiment, a system 300 may comprise a processor 302 adapted for executing logic. The logic may be configured for creating an address allocation table comprising a plurality of values, each value being associated with a plurality of destination addresses which, when an algorithm is applied thereto, result in the associated value, logic configured for receiving a request for an IP address from a device electrically connected to a switch, and logic configured for determining a port to which the device is electrically connected to the switch based on the port on which the request is received.

In further embodiments, the system may include logic configured for choosing the IP address from the address allocation table such that applying the algorithm to the chosen IP address results in a value that is associated with the port to which the device is electrically connected to the switch, and logic configured for assigning the chosen IP address to the device connected to the port.

Figure 5:
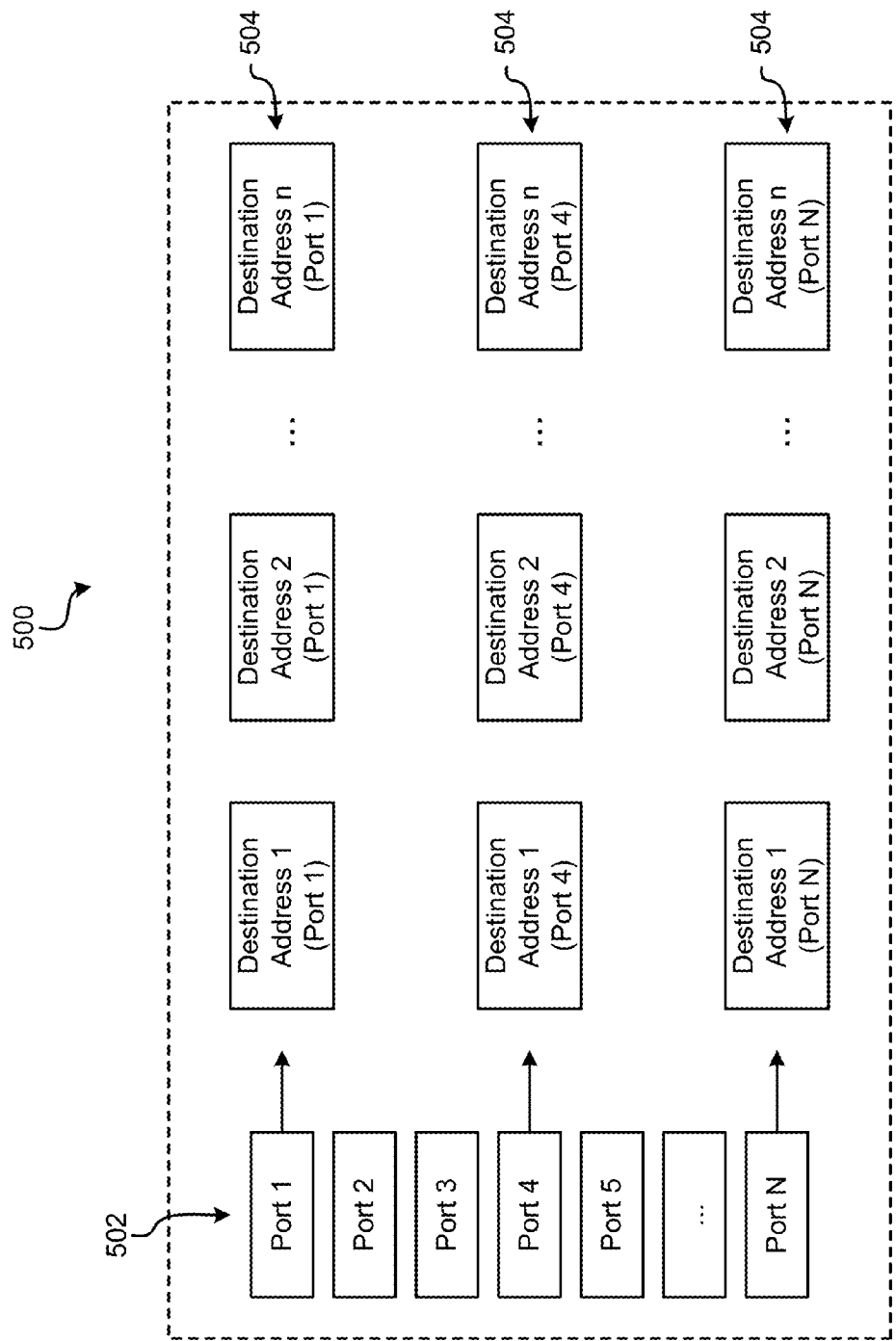
FIG. 5 shows an address allocation table, according to one embodiment.

FIG. 5 shows an address allocation table 500 HT[N] of size N, according to one exemplary embodiment. Of course, any size address allocation table 500 may be used based on the number of ports on an individual switching device.

As shown in FIG. 5, for each destination port 502, there are any number of destination addresses 504 that may be associated therewith, with the only caveat being that each destination address 504, when the algorithm is applied thereto, results in a value associated with the destination port 502.

Figure 6:
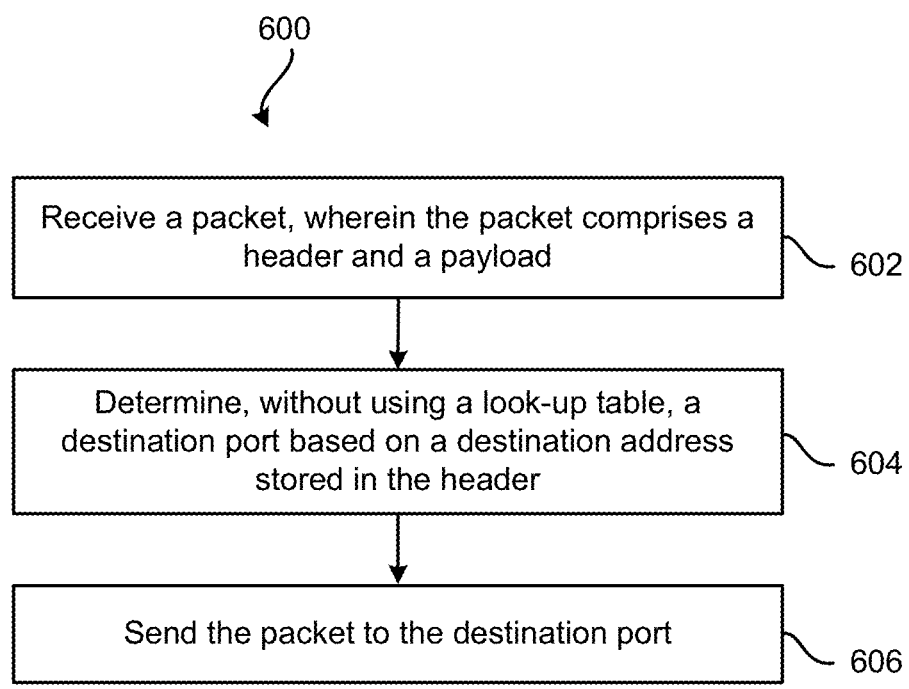
FIG. 6 is a flowchart of a method, according to one embodiment.

Now referring to FIG. 6, a flowchart of a method 600 is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a switching device and/or a DHCP server of a switching device, and/or a standalone DHCP server connected to a plurality of switches and/or devices.

As shown in FIG. 6, method 600 may initiate with operation 602, where a packet is received. The packet comprises a header and a payload, in one approach. The packet may be received by a packet switching ASIC of a packet switching device, in one embodiment. Of course, in some further embodiments, more than one packet may be received, in which case the method 600 may be repeated as many times as is necessary to process all of the received packets.

In operation 604, without using a look-up table, a destination port is determined based on a destination address stored in the header of the packet. This determination may be made using the packet switching ASIC of the packet switching device, in one embodiment.

In further embodiments, the determining the destination port based on the destination address stored in the header without using the look-up table may comprise: calculating a value of the destination address in the header using an algorithm and selecting a destination port associated with the value, wherein each destination port is pre-associated with one value.

Any algorithm may be used as known in the art, including, but not limited to, those described herein and other perfect algorithms and imperfect algorithms employing any known functions, such as hash functions, relativity functions, artificial neural network functions, transform functions, etc.

In a further embodiment, if a destination port is not determinable based on applying the algorithm to the destination address obtained from a header of the packet, the destination address may be associated with a destination port that is appropriate for that destination address, using conventional methods known in the art, such as by constructing a limited look-up table having only entries for addresses which do not properly result in a value associated with a port. This situation may occur with legacy systems that use their own DHCP servers for assigning addresses to devices, that do not conform to the algorithm(s) described herein or known in the art, such as those which assign addresses according to some other rationale.

Accordingly, in some embodiments, a hybrid solution may be used that is capable of dealing with these addresses and requests that do not conform with the overall scheme presented herein, while still affording the advantages to most requests that the scheme described herein provides.

In a further embodiment, an address for a device may be chosen from an address allocation table such that applying the algorithm to the chosen address results in a value that is associated with a port connected to the device.

In one approach, the address allocation table may be created during a start-up process of a server, such as a DHCP server of a switching device, and stored to a memory of the server.

In another approach, the address allocation table may comprise a plurality of values, each value being associated with a plurality of addresses which, when the algorithm is applied thereto, results in the associated value. The number of values capable of being produced by the algorithm may match the number of ports of a system to which devices are connected. In another approach, any excess values may be ignored (along with the associated addresses when assigning addresses and when calculating values for a received address) or may be associated with a port that already has a value assigned (e.g., for port 3 of a switch, address which result in a value of 3 and a value of 103 may be assigned to devices connected to port 3, for example). In this way, no addresses would be unused for a perfect algorithm. Any other method of accounting for overlap, unused addresses, or values may be used, as one of skill in the art would appreciate.

In operation 606, the packet is sent to the destination port. The sending of the packet may be accomplished using the switching ASIC of the packet switching device, in one embodiment.

According to one embodiment, the destination address may comprise an IP address.

In more approaches, the algorithm may include at least one of: a hashing function, a transform function, a relativity function, and an artificial neural network function.

In another embodiment, the method 600 may include the following operations. First, receiving a second packet, wherein the second packet comprises a header and a payload. Second, determining, without using a look-up table, a second destination port based on a second destination address stored in the second packet header by calculating a second value of the second destination address using a second algorithm and selecting the second destination port associated with the second value, wherein each destination port is pre-associated with one value. Third, sending the second packet to the second destination port. In one approach, the algorithm and the second algorithm may comprise different functions, may be different algorithms, etc. This may be useful when a first group of devices connected to the server operate according to one algorithm and have their addresses assigned from a first address allocation table, and a second group of devices connected to the server operate according to a second algorithm and have their addresses assigned from a second address allocation table. Any number of tables and groups of devices may be connected to a single DHCP server in this fashion, each operating under different algorithms.

Furthermore, in one approach, a plurality of algorithms may be available to a DHCP server when assigning addresses to devices. The server may choose among the algorithms when constructing the address allocation table, according to desired operating characteristics, as known in the art.

Figure 7:
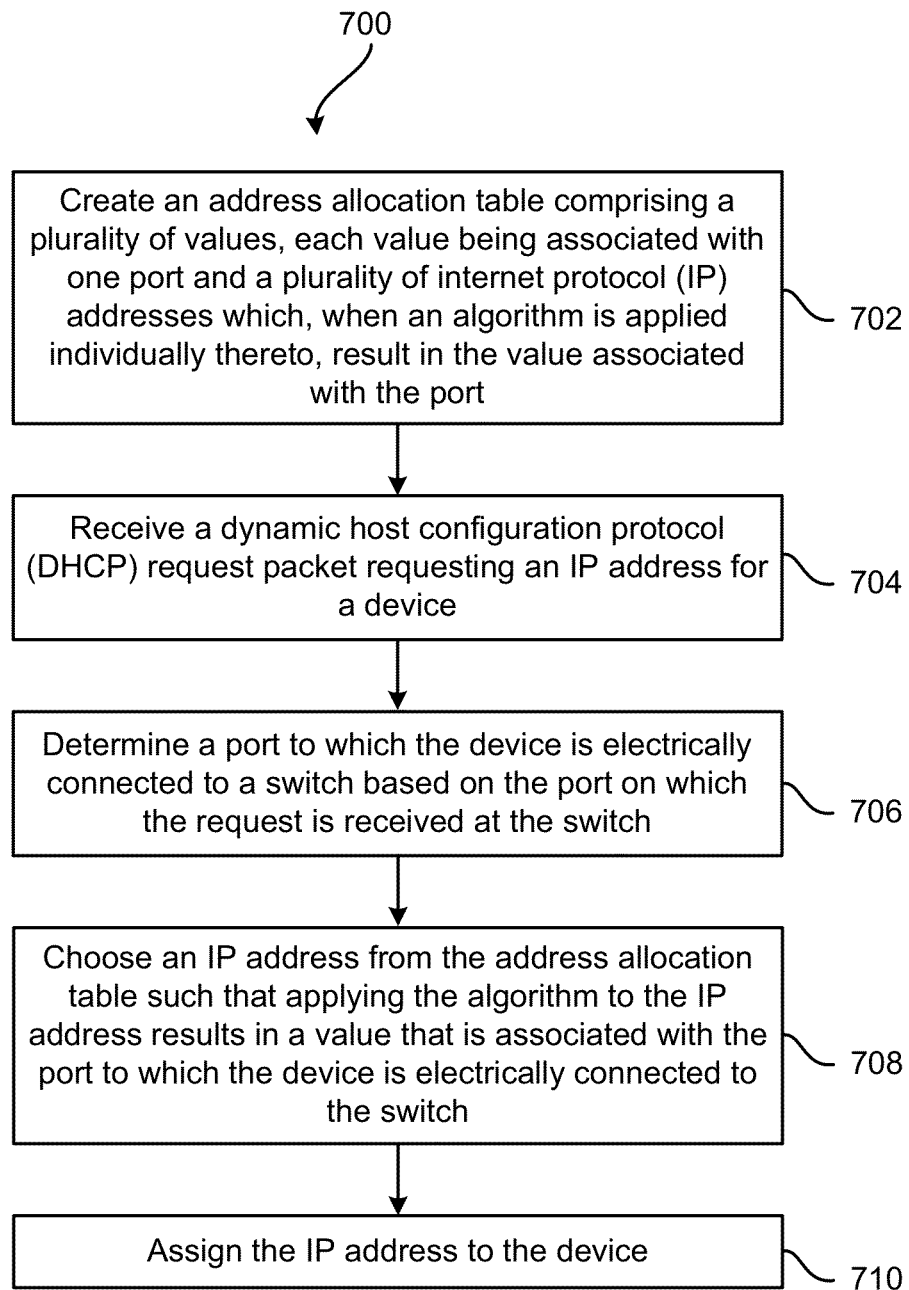
FIG. 7 is a flowchart of a method, according to another embodiment.

Now referring to FIG. 7, a flowchart of a method 700 for assigning IP addresses is shown, according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a switching device, a DHCP server of a switching device, and/or a standalone DHCP server.

As shown in FIG. 7, method 700 may initiate with operation 702, where an address allocation table comprising a plurality of values is created, each value being associated with one port and a plurality of IP addresses which, when an algorithm is applied individually thereto, result in the value associated with the port.

Any algorithm may be used, as described herein and/or known in the art, such as an algorithm that comprises at least one of: a hashing function, a transform function, a relativity function, and an artificial neural network function.

In operation 704, a DHCP request packet requesting an IP address for a device is received.

In operation 706, a destination port to which the device is electrically connected to a switch is determined based on the port on which the request is received at the switch.

In operation 708, an IP address is selected from the address allocation table such that applying the algorithm to the IP address results in a value that is associated with the port to which the device is electrically connected to the switch.

In operation 710, the IP address is assigned to the device.

In further embodiments, the method 700 may comprise receiving a request for one or more destination addresses from one or more devices connected to a first destination port, choosing the one or more destination addresses from the address allocation table such that applying the algorithm to each of the one or more chosen destination addresses results in a value that is associated with the first destination port, and assigning the one or more chosen destination addresses to the one or more devices connected to the first destination port. In this way, each time a packet is received that is requested to be sent to this destination address, all that is needed is to apply the algorithm to the destination address to determine the destination port on which to send out the packet, without using a look-up table.

In more approaches, the choosing the IP address from the address allocation table may comprise sequentially, randomly, etc., choosing a next available IP address from a plurality of available IP addresses. An available IP address is an IP address which is not currently assigned to a device. In this way, it is easy to find an available IP address to assign to a new device.

In another approach, the method 700 may further comprise, upon choosing the IP address from the address allocation table, marking the IP address as unavailable, or removing the IP address from the address allocation table and adding the IP address to a used address table. In this way, either a single table or multiple tables may be maintained. The single table would be used if each of the IP addresses are capable of having a flag indicated therewith, such that it can be easily determined if the IP address is assigned (unavailable) or not (available). The multiple tables would be used if an available list and an unavailable list is to be maintained.

In a further approach, when using multiple tables, upon a device releasing the IP address assigned thereto, the IP address may be added to the address allocation table and the IP address may be removed from the used address table.

In a further approach, when using a single table, upon a device releasing the IP address assigned thereto, the IP address is marked as available.

In any approach, the marking may comprise flipping an indication bit associated with the IP address in the address allocation table. Furthermore, the address allocation table may be created during a start-up process (boot-up), such as of the DHCP server of the switching device, according to one embodiment.

According to some embodiments, the algorithm may be tuned for flat layer 2 networks where all the hosts or servers are assigned with IP addresses of the same subnet. However, other algorithms may be possible that account for other network configurations.

For example, for unicast IP packets, if the destination IP address is from the same subnet, the algorithm may be applied on the destination IP address. Then, the destination port associated therewith is determined based on the value obtained, and the packet is forwarded to the destination port. If the destination IP address is not from the same subnet, then the packet may be forwarded to an uplink or router port for processing (switching) elsewhere.

In another example, for ARP packets, the IP address may be extracted from the ARP packet. Next, the algorithm may be applied on that IP address and the port for the device in question may be determined based on the value obtained. Then, a unicast packet may be forwarded to the destination port only (instead of traditionally flooding the ARP packet multicast to all devices).

Some of the advantages of using the methods and systems described herein include executing switching decisions without using a look-up table (which saves time and processing capacity), ARP broadcast/flooding is not required (which saves huge amounts of bandwidth), and very low latency is provided due to the extremely fast switching algorithm being applied, which also simplifies switching logic and thus cost.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for assigning internet protocol (IP) addresses, the method comprising:
    creating an address allocation table comprising a plurality of values, each value being associated with one port and a plurality of IP addresses which, when an algorithm is applied individually thereto, result in the value associated with the port;
    receiving a dynamic host configuration protocol (DHCP) multicast packet requesting an IP address for a device;
    determining a port to which the device is electrically connected to a switch based on the port on which the request is received at the switch;
    choosing an IP address from the address allocation table such that applying the algorithm to the IP address results in a value that is associated with the port to which the device is electrically connected to the switch; and
    assigning the IP address to the device,
    wherein the algorithm comprises at least one of: a transform function, a relativity function, or an artificial neural network function.

2. The method as recited in claim 1, wherein the choosing the IP address from the address allocation table comprises sequentially or randomly choosing a next available IP address from a plurality of available IP addresses, wherein an available IP address is an IP address which is not currently assigned to a device.

3. The method as recited in claim 1, further comprising, upon choosing the IP address from the address allocation table, marking the IP address as unavailable, or removing the IP address from the address allocation table and adding the IP address to a used address table.

4. The method as recited in claim 3, further comprising, upon a device releasing the IP address assigned thereto, either:
    adding the IP address to the address allocation table and removing the IP address from the used address table; or
    marking the IP address as available, wherein the marking comprises flipping an indication bit associated with the IP address in the address allocation table.

5. A system, comprising a processor and logic integrated with and/or executable by the processor, the logic being configured to cause the processor to:
    create an address allocation table comprising a plurality of values, each value being associated with one port and a plurality of internet protocol (IP) addresses which, when an algorithm is applied individually thereto, result in the value associated with the port;

receive a dynamic host configuration protocol (DHCP) multicast packet requesting an IP address for a device;

determine a port to which the device is electrically connected to a switch based on the port on which the request is received at the switch;

choose an IP address from the address allocation table such that applying the algorithm to the IP address results in a value that is associated with the port to which the device is electrically connected to the switch; and assign the IP address to the device, wherein the algorithm comprises at least one of: a transform function, a relativity function, or an artificial neural network function.

6. The system as recited in claim 5, wherein the logic configured to cause the processor to choose the IP address from the address allocation table is configured to cause the processor to sequentially or randomly choose a next available IP address from a plurality of available IP addresses, wherein an available IP address is an IP address which is not currently assigned to a device.

7. The system as recited in claim 5, wherein the logic is further configured to cause the processor to:

mark the IP address as unavailable upon choosing the IP address from the address allocation table; or remove the IP address from the address allocation table and add the IP address to a used address table upon choosing the IP address from the address allocation table.

8. The system as recited in claim 7, wherein the logic is further configured to cause the processor to:

add the IP address to the address allocation table and remove the IP address from the used address table upon a device releasing the IP address assigned thereto; or mark the IP address as available by flipping an indication bit associated with the IP address in the address allocation table upon a device releasing the IP address assigned thereto.

9. The system as recited in claim 5, wherein the address allocation table is created during a start-up process of a server and stored to a computer readable storage medium.

10. The system as recited in claim 5, wherein the logic is further configured to cause the processor to:

receive an address resolution protocol (ARP) broadcast packet from a first device, wherein the ARP broadcast packet comprises an ARP request comprising an internet protocol (IP) address;

extract the IP address from the ARP request and calculate a value based on the IP address using the algorithm;

select a port associated with the value, wherein each port is pre-associated with one value; and unicast the broadcast ARP packet to the selected port to determine a media access control (MAC) address of a second device electrically connected to the selected port.

11. The system as recited in claim 10, wherein the logic is further configured to cause the processor to store the value for the second device and the associated port in the address allocation table.

* * * * *